Sept. 8, 1942.  C. J. HORN  2,295,474
HEATING FURNACE WORK-CARRYING SKID
Filed June 16, 1941
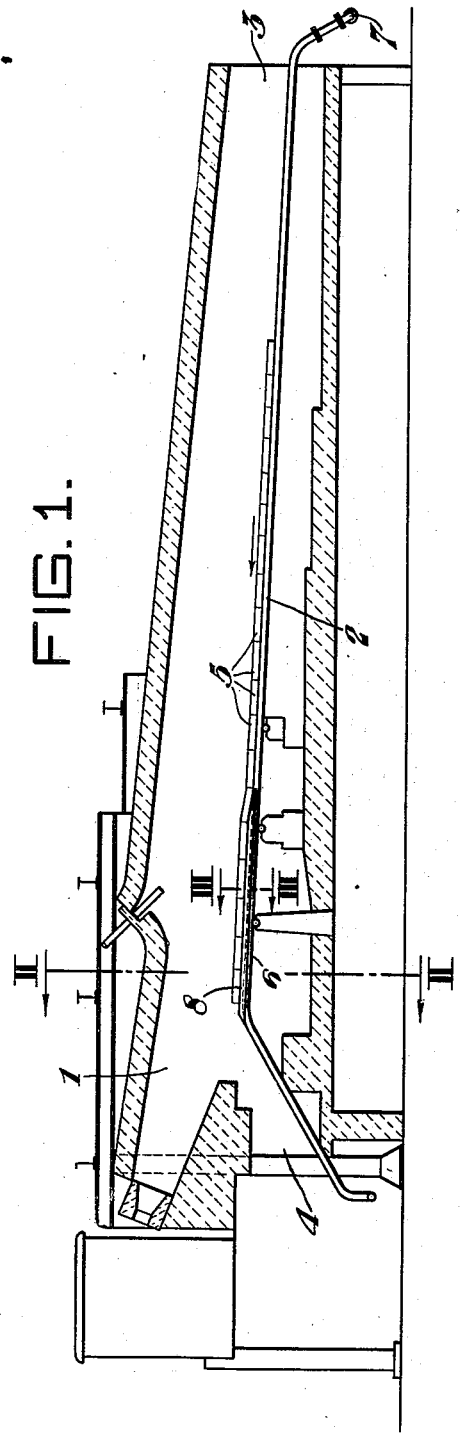
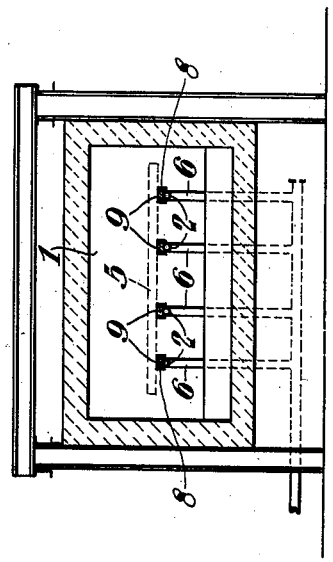
Inventor:
CHARLES J. HORN,
by John E. Jackson
his Attorney.

Patented Sept. 8, 1942

2,295,474

UNITED STATES PATENT OFFICE 2,295,474

HEATING-FURNACE WORK-CARRYING SKID

Charles J. Horn, Chicago, Ill.

Application June 16, 1941, Serial No. 398,357

1 Claim. (Cl. 263—1)

This invention relates to heating-furnace work-carrying skids, and, particularly, the skids over which the work is pushed in a continuous steel slab or billet heating furnace or similar furnaces.

A specific example of the invention is illustrated by the accompanying drawing in which:

Figure 1 is a longitudinal vertical section of a steel slab heating furnace embodying the principles of the invention;

Figure 2 is a vertical cross-section taken from the line II—II of Figure 1; and

Figure 3 is a cross-sectional enlargement taken from the line III—III of Figure 1.

More specifically, the drawing shows a steel slab heating furnace having a heat-soaking portion 1 wherein the temperature is at a maximum, and skids 2 extending longitudinally through the furnace from its entrance 3 to its exit 4, the work being in the form of slabs 5 being pushed through the furnace transversely over these skids 2.

These skids 2 are in the form of steel pipes 6 which are provided with cooling water from a header 7, the water exhausting from the other ends of the pipes. Water-cooled skids of this general type are old, the cooling being necessary in view of the fact that the skids must go directly through the furnace including its hottest portion.

According to the present invention, the pipes 6 which comprise the skids 2 are provided with longitudinally extending upstanding walls 8 which are fixed to the respectively opposite sides of the pipe in laterally spaced relation, refractory thermal insulation material 9 being filled between these walls flush to their tops.

This refractory thermal insulating material protects the pipe 6 from wear, eliminates cold spots in the workpieces being heated in the furnace by retarding the transfer of heat from the workpieces to the skid cooling fluid, effects a reduction in the cost of the fuel for heating the material and increases the heating capacity of the furnace, these last two named results following from the thermal insulation retarding the loss of heat from the furnace by way of the skid-cooling fluid. Furthermore, on account of the workpieces being uniformly heated, these pieces can be rolled in a rolling mill more rapidly and uniformly and will produce an improved quality product, this assuming that the furnace is used to heat metal so that it can be hot rolled.

More specifically referring to the skids, the walls 8 are stainless steel strips which are tangentially welded to the opposite sides of the pipe 6, the welding metal being shown at 10. The top edges of these walls are, of course, flush, the material 9 being laid similarly flush to provide the skid with a flat top. Cross bracing bars 11 extend from wall to wall to hold them in position more securely.

I claim:

A skid over which work slides in a furnace, comprising a metal pipe having thermal insulation on its top for carrying the work, said pipe having upstanding walls fixed to its opposite sides in laterally spaced relation with said insulation in the form of refractory material arranged between said walls.

CHARLES J. HORN.